June 23, 1925.
R. H. SEMONES
1,543,487
COMBINATION VEHICLE SPRING, BUMPER, AND SHOCK ABSORBER
Filed May 19, 1923
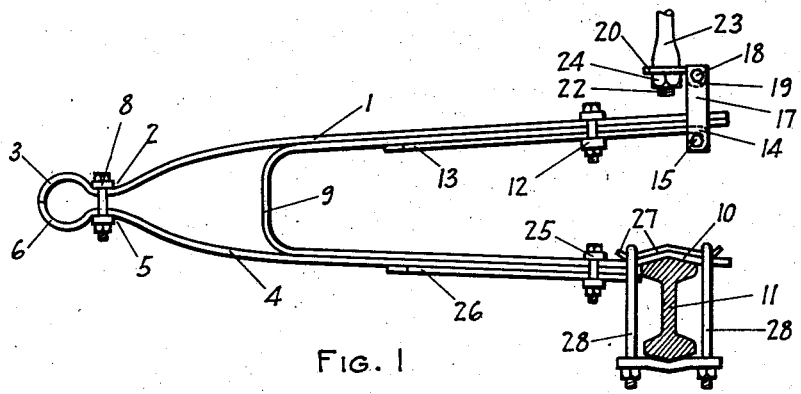
Fig. 1
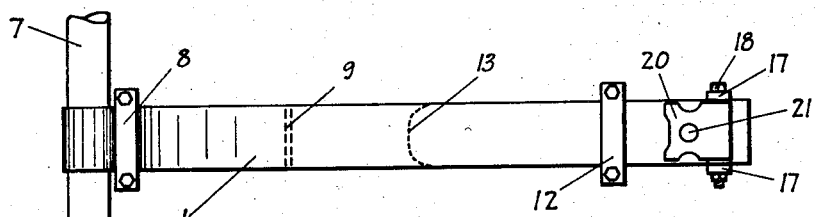
Fig. 2
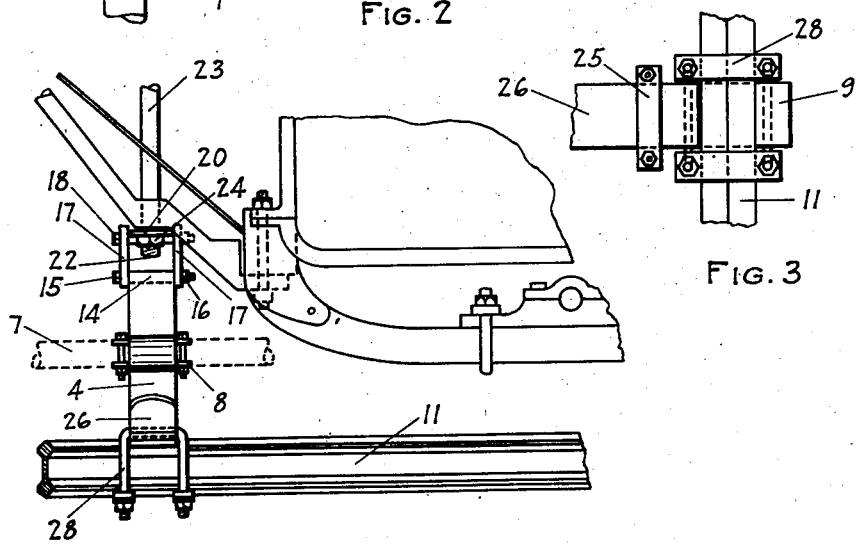
Fig. 3
Fig. 4
WITNESS:
William B. Hormell
INVENTOR,
Robert H. Semones,
BY
Howard S. Smith,
ATTORNEY.

Patented June 23, 1925.

UNITED STATES PATENT OFFICE.

ROBERT H. SEMONES, OF DAYTON, OHIO.

COMBINATION VEHICLE SPRING, BUMPER, AND SHOCK ABSORBER.

Application filed May 19, 1923. Serial No. 640,256.

*To all whom it may concern:*

Be it known that I, ROBERT H. SEMONES, a citizen of the United States, residing at Dayton, in the county of Montgomery and State of Ohio, have invented certain new and useful Improvements in a Combination Vehicle Spring, Bumper, and Shock Absorber, of which the following is a specification.

It is the principal object of my invention to provide a combination vehicle spring, bumper and shock-absorber that may be easily applied to an automobile to ease road shocks and protect the machine in front and rear collisions. The device is simple in construction, it is efficient in service, and in combining the functions of a spring, bumper and shock-absorber it is quite economical for the motorist.

In the accompanying drawings illustrating my invention, Figure 1 is a side elevational view of my device applied to the front part of a well known automobile, the front axle being shown in section. Figure 2 is a top plan view of the same. Figure 3 is a bottom plan view of the outer, or bumper receiving, end of the device. And Figure 4 is a front view of my device applied to a well known automobile.

Referring to the accompanying drawings for a detailed description of my invention, the numeral 1 designates a top plate or leaf made of good spring steel, which curves downwardly at its front end to provide a clip-receiving recess 2 and terminates in a semicircular bumper-receiving part 3. The numeral 4 designates a similar plate or leaf which curves upwardly at its front end to provide a clip-receiving recess 5 and terminates in a semicircular bumper receiving-part 6. The parts 3 and 6 of the leaves 1 and 4 respectively are tightly drawn against a bumper rod 7 by a spring clip 8 which is fitted into the recesses 2 and 5 of them. (See Figures 1 and 2).

Fitted between the spring leaves 1 and 4 is a U-shaped spring leaf 9 whose lower rear end 10 is made slightly convex to rest upon the top of an axle 11, which in the present instance is the front axle of a well known automobile. Secured against the bottom surface of the rear top part of the spring leaf 9, by means of a clip 12, is a spring leaf 13 which terminates at its rear end in a sleeve portion 14 which receives a bolt 15. Mounted on the ends of the bolt 15, one between the head of the bolt and the sleeve portion of the leaf 13, and the other between the latter and a nut 16 on the end of the bolt, are two upwardly projecting arms 17, 17 which straddle the ends of the spring leaves 1 and 9. Carried by the upper ends of these arms 17, 17 is a bolt 18 to which is secured the rear knuckle end 19 of a short plate 20. The latter contains a central hole 21 to receive the lower threaded end 22 of a lamp post 23 on a well known car, to which said plate is firmly secured by a nut 24. (See Figures 1 and 4). However, this plate may be secured to any other suitable projecting element on the automobile.

Secured against the bottom surface of the rear part of the spring leaf 4, by a spring clip 25, is a short bracing leaf 26. Mounted upon the convex end 10 of the spring leaf 9 is a convex apron piece 27 over which the top of a clip 28 fits to firmly secure the spring structure just described to the axle 11. (See Figures 1, 2 and 3).

My spring structure just described is so constructed that it may be easily applied to an automobile to act as an efficient shock absorber and a bumper rod support. The spring leaves are so arranged as to strongly resist the sudden rebound that is usually incident to the springs of automobiles when an obstruction or depression in the road is encountered by the wheels thereof. Furthermore, the extension and formation of the spring leaves 1 and 4 to support a bumper rod at their front ends, adds to my spring structure a function which is usually provided by a separate device. Therefore, in combining the functions of a spring, bumper and shock-absorber, my device is economical as well as efficient.

I do not wish to be limited to the details of construction and arrangement herein shown and described, and any changes or modifications may be made therein within the scope of the subjoined claims.

Having described my invention, I claim:

1. A structure of the type described comprising a pair of outwardly projecting superimposed leaf springs, a resilient bracing element secured between said springs, the latter terminating at their front ends in bumper receiving portions, and a bumper rod secured between said portions.

2. A structure of the type described comprising a pair of outwardly projecting superimposed leaf springs, a U-shaped spring secured between said springs, the latter terminating at their front ends in bumper receiving portions, and a bumper rod secured between said portions.

3. A structure of the type described comprising a pair of outwardly projecting superimposed leaf springs, means for securing the rear end of the top spring to the body of an automobile, means for securing the bottom spring to the axle thereof, said springs curving toward each other at their front ends and terminating in semi-circular bumper receiving portions, and a bumper rod secured between said portions.

4. A structure of the type described comprising a pair of outwardly projecting superimposed leaf springs, a bumper rod secured between the outer ends of the latter, a U-shaped spring secured between said leaf springs, a short leaf spring secured to the under side of the rear end of the U-shaped spring, upwardly projecting arms pivotally secured to the rear end of the short leaf spring, a plate pivotally secured between the upper ends of said arms for attachment to the body of an automobile, and a clip for securing the rear ends of the lower leaf spring and the U-shaped spring to the axle of said automobile.

In testimony whereof I have hereunto set my hand this 18th day of May, 1923.

ROBERT H. SEMONES.

Witness:
HOWARD S. SMITH.